US010585189B1

(12) United States Patent
Dove et al.

(10) Patent No.: US 10,585,189 B1
(45) Date of Patent: Mar. 10, 2020

(54) SHARING AIR DATA BETWEEN AIRCRAFT FOR THREAT DETECTION

(75) Inventors: Richard S. Dove, Palm Bay, FL (US); Andrew M. Vesel, Indialantic, FL (US); William T. Greenleaf, Indialantic, FL (US); Scott F. Bauler, Melbourne, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 286 days.

(21) Appl. No.: 13/236,717

(22) Filed: Sep. 20, 2011

(51) Int. Cl.
*G01S 13/95* (2006.01)
*G01W 1/08* (2006.01)
*G01S 7/00* (2006.01)
*G01W 1/00* (2006.01)

(52) U.S. Cl.
CPC .............. *G01S 13/95* (2013.01); *G01S 7/003* (2013.01); *G01S 13/951* (2013.01); *G01S 13/953* (2013.01); *G01S 13/955* (2013.01); *G01W 1/08* (2013.01); *G01W 2001/003* (2013.01)

(58) Field of Classification Search
CPC .... G01S 13/951–13/955; G01S 13/958; G01S 7/003; G01W 1/08
USPC ...................................................... 342/26 B
See application file for complete search history.

(56) References Cited

U.S. PATENT DOCUMENTS

| 5,265,024 | A * | 11/1993 | Crabill ................. G05D 1/0055 342/26 A |
| 6,184,816 | B1 * | 2/2001 | Zheng et al. ............... 342/26 R |
| 6,456,226 | B1 * | 9/2002 | Zheng ..................... G01S 7/003 340/945 |
| 6,501,392 | B2 * | 12/2002 | Gremmert ............... G01S 7/003 340/945 |
| 6,563,452 | B1 * | 5/2003 | Zheng ..................... G01S 7/003 342/195 |
| 6,977,608 | B1 * | 12/2005 | Anderson et al. .......... 342/26 B |
| 7,633,428 | B1 * | 12/2009 | McCusker et al. ......... 342/26 B |
| 7,817,078 | B2 * | 10/2010 | Bunch ..................... G01S 7/003 342/176 |
| 8,022,859 | B2 * | 9/2011 | Bunch ................... G01S 13/953 342/26 A |
| 8,130,121 | B2 * | 3/2012 | Smith .................. G08G 5/0091 340/945 |
| 8,165,790 | B2 * | 4/2012 | Bailey ..................... G01W 1/08 340/901 |

(Continued)

FOREIGN PATENT DOCUMENTS

EP        2096470 A1 *  9/2009  .............. G01W 1/02

OTHER PUBLICATIONS

Chakeres, I.D.; Belding-Royer, E.M. "The Utility of Hello Messages for Determining Link Connectivity," The 5th International Symposium on Wireless Personal Multimedia Communications, 2002. vol. 2, pp. 504-508. Oct. 27-30, 2002.*

(Continued)

*Primary Examiner* — Matthew M Barker

(74) *Attorney, Agent, or Firm* — Suiter Swantz pc llo

(57) ABSTRACT

An apparatus for forecasting weather related threats aboard an aircraft includes a computer for sending and receiving meteorological data to and from other aircraft in a self-organizing mesh network of aircraft. The computer isolates meteorological sensor data originating from the other aircraft in a region along the flight path of the aircraft and uses that data to forecast weather related threats along the aircraft's flight path.

16 Claims, 5 Drawing Sheets

(56) References Cited

U.S. PATENT DOCUMENTS

| | | | | |
|---|---|---|---|---|
| 8,209,071 B2* | 6/2012 | Ross | ............ | G01S 7/003 |
| | | | | 701/10 |
| 8,217,828 B2* | 7/2012 | Kirk | ............ | 342/62 |
| 8,223,062 B2* | 7/2012 | Bunch et al. | ............ | 342/26 B |
| 8,314,730 B1* | 11/2012 | Musiak | ............ | G01S 7/003 |
| | | | | 342/25 B |
| 8,339,583 B2* | 12/2012 | Tillotson | ............ | 356/28 |
| 8,344,933 B1* | 1/2013 | Kronfeld et al. | ............ | 342/25 R |
| 8,629,788 B1* | 1/2014 | Greenleaf | ............ | G08G 5/0091 |
| | | | | 244/116 |
| 8,681,021 B1* | 3/2014 | Carrico | ............ | G08G 5/0091 |
| | | | | 340/970 |
| 8,744,747 B1* | 6/2014 | Bailey | ............ | G01C 21/20 |
| | | | | 701/408 |
| 2005/0090201 A1* | 4/2005 | Lengies et al. | ............ | 455/41.2 |
| 2009/0177343 A1* | 7/2009 | Bunch | ............ | G01S 7/22 |
| | | | | 701/14 |
| 2010/0042275 A1* | 2/2010 | Kirk | ............ | 701/14 |
| 2010/0142482 A1* | 6/2010 | Lu et al. | ............ | 370/331 |
| 2010/0271239 A1* | 10/2010 | Kolcarek et al. | ............ | 340/971 |
| 2010/0328143 A1* | 12/2010 | Kirk | ............ | 342/26 B |
| 2010/0332056 A1* | 12/2010 | Kirk | ............ | 701/14 |
| 2011/0102192 A1* | 5/2011 | Batsakes et al. | ............ | 340/905 |
| 2011/0257818 A1* | 10/2011 | Ganz | ............ | G01W 1/00 |
| | | | | 701/14 |

OTHER PUBLICATIONS

G. Alonso, E. Kranakis, R. Wattenhofer and P. Widmayer, "Probabilistic protocols for node discovery in ad-hoc, single broadcast channel networks," Proceedings International Parallel and Distributed Processing Symposium, Apr. 22-26, 2003, 8 pages. doi: 10.1109/IPDPS.2003.1213399.*

* cited by examiner

US 10,585,189 B1

SHARING AIR DATA BETWEEN AIRCRAFT FOR THREAT DETECTION

FIELD OF THE INVENTION

The present invention is directed generally toward meteorological sensor data sharing, and more particularly toward a self-organizing mesh network comprised of aircraft.

BACKGROUND OF THE INVENTION

Aircraft routinely encounter weather related threats such as clear air turbulence (CAT). These threats may not be identifiable from ground stations, either because the threats are invisible to ground based instruments or because there are no ground based instruments within range of the threats or the aircraft (over an ocean for example).

Aircraft travel would be generally safer if the pilot knew of weather related threats in advance. The pilot could take measures to mediate the threat or even avoid the threat entirely. However, the only method currently available for warning pilots of weather related threats in the vicinity of the aircraft involves other pilots in other aircraft manually reporting weather related threats to a ground station, and that ground station subsequently disseminating that information to other pilots. This system is prone to delay, especially where a pilot encounters a weather related threat over an ocean, and reflects only such information as may be reported.

Information regarding weather related threats would be more useful if pilots in the vicinity could receive weather related information from other pilots in the vicinity in real-time or nearly real-time. Real-time sharing of information is not practical with current technology. Pilots would be required to continuously transmit weather related information while at the same time continuously listen for weather related information from an unknown multitude of potential sources.

Consequently, it would be advantageous if an apparatus existed that is suitable for automatically sharing weather related information among aircraft in a given locality.

SUMMARY OF THE INVENTION

Accordingly, the present invention is directed to a novel method and apparatus for automatically sharing weather related information among aircraft in a given locality.

One embodiment of the present invention includes a computer, installed on an aircraft, implementing a radio. In these embodiments, "radio" should be understood to include a software defined radio or fixed mode radio. The computer may include computer readable code to establish a mesh network with similar computers installed aboard other aircraft while in flight. The computer may add nodes to the mesh network or remove nodes from the mesh network as aircraft come into contact or move out of contact. The computer may send and receive weather related (meteorological) data from other computers in the mesh network and process the meteorological data to forecast any weather related threats in the vicinity.

In another embodiment, the present invention includes a plurality of nodes in a self-organizing network. Each node may comprise a computer operably connected to meteorological data sensors aboard the aircraft. The computer may send and receive meteorological sensor data to and from one or more of the other nodes in the network and use that meteorological sensor data to forecast any weather related threats in the vicinity.

In another embodiment, the present invention includes a method, performed by a computer, for forecasting weather related threats aboard an aircraft. The method may include receiving meteorological data from other aircraft in a self-organizing network of aircraft; processing the meteorological data; and using that meteorological data to forecast any weather related threats in the vicinity.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
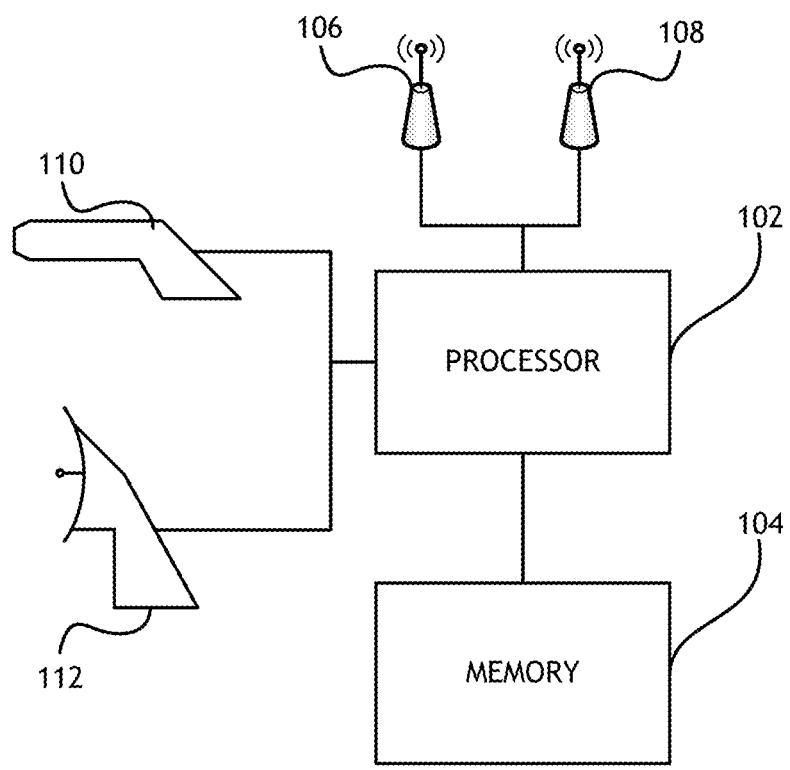
FIG. 1 shows a block diagram of an apparatus for receiving and transmitting meteorological sensor data.

Referring to FIG. 1, an apparatus suitable for use as a node in a self-organizing network is shown. The apparatus may be configured to send and receive meteorological data to other nodes in the self-organizing network. The apparatus may comprise a processor 102 and memory 104, a transmitter 106 and a receiver 108, and a plurality of meteorological data sensors 110 and 112. The plurality of meteorological data sensors 110 and 112 may include radar, pitot tubes, thermometers, barometers or any other instrument installed in an aircraft, capable of producing meteorological data. In the case of CAT, accelerometers may detect violent movement of the aircraft indicative of CAT; therefore, accelerometers should also be considered instruments capable of producing meteorological data. The processor 102 may execute computer code to transmit meteorological data produced by the plurality of meteorological data sensors 110 and 112 through the transmitter 106 to other nodes in the self-organizing network. The processor 102 may also execute computer code to receive data through the receiver 108 from other nodes in the self-organizing network. Furthermore, the processor 102 may be configured to retransmit meteorological data received from at least one node in the self-organizing network to at least one other node in the self-organizing network. Processor 102 may use meteorological data produced by the plurality of meteorological data sensors 110 and 112 and meteorological data received from other nodes in the self-organizing network to produce a forecast of weather related threats.

Figure 2:
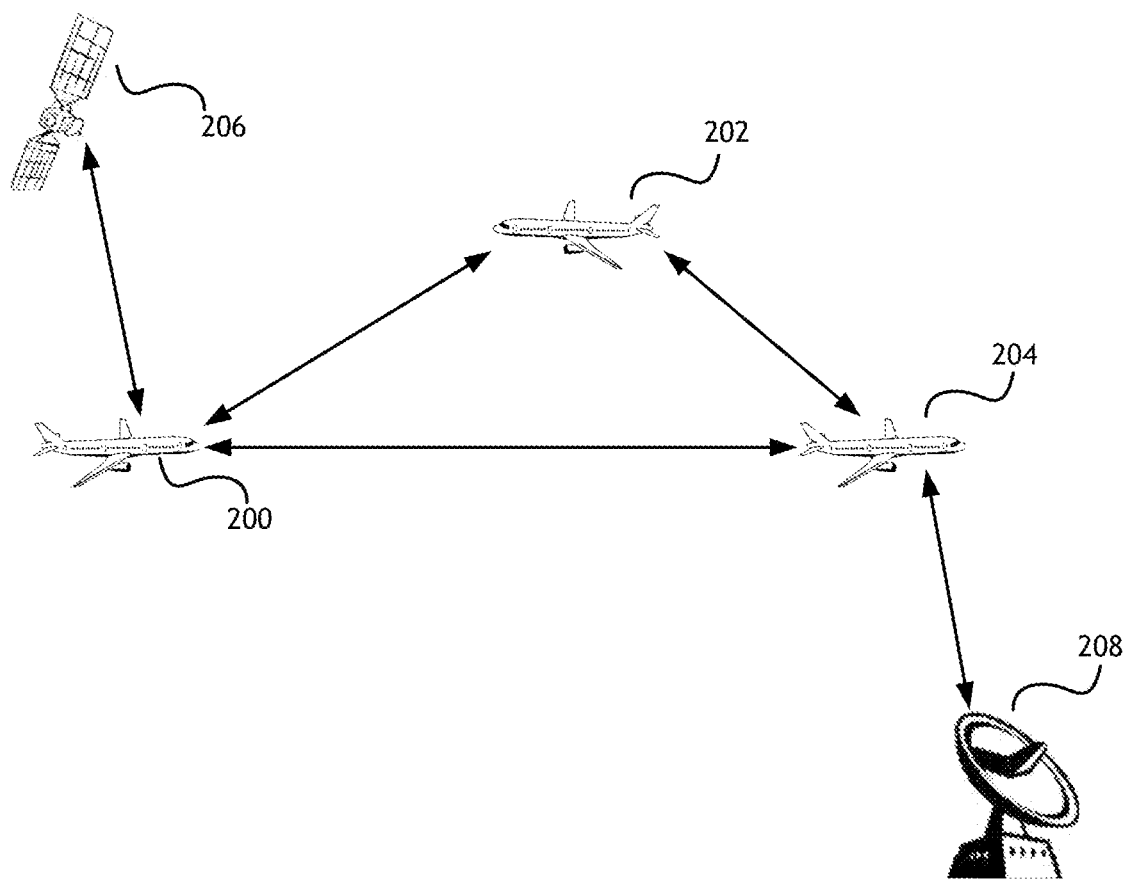
FIG. 2 shows a diagram of a node network for receiving and transmitting meteorological sensor data.

Referring to FIG. 2, a network suitable for implementing the present invention is shown. Such network may include a plurality of aircraft 200, 202 and 204; each aircraft 200, 202 and 204 equipped with one or more meteorological sensors, a transmitter, a receiver and a computer transmitting and receiving meteorological data from other nodes in the network, including the other aircraft 200, 202 and 204. The network may also include one or more ground stations 208 and one or more satellites 206. Ground stations 208 may relay meteorological data to and from sources outside the self-organizing network. Likewise, satellites 206 may relay meteorological data to and from sources outside the self-organizing network.

Figure 3A:
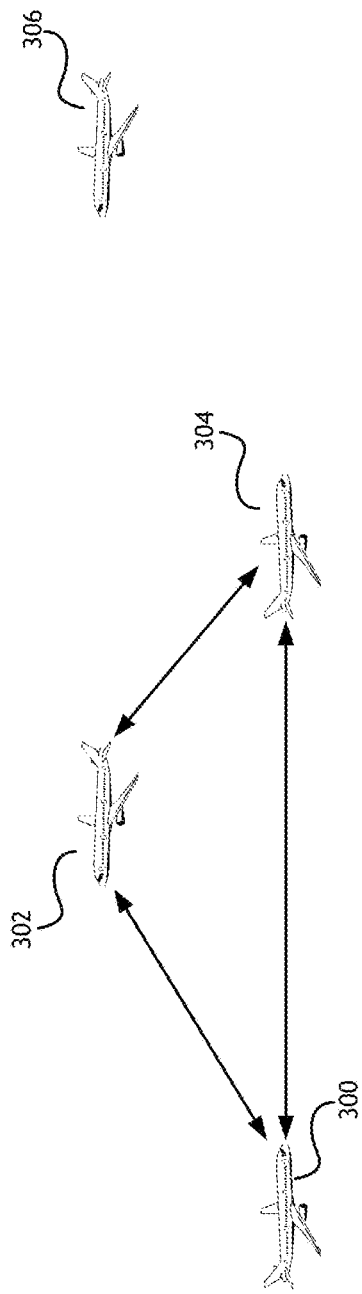
FIG. 3a shows a diagram of a node network according to one implementation of the present invention.
Figure 3B:
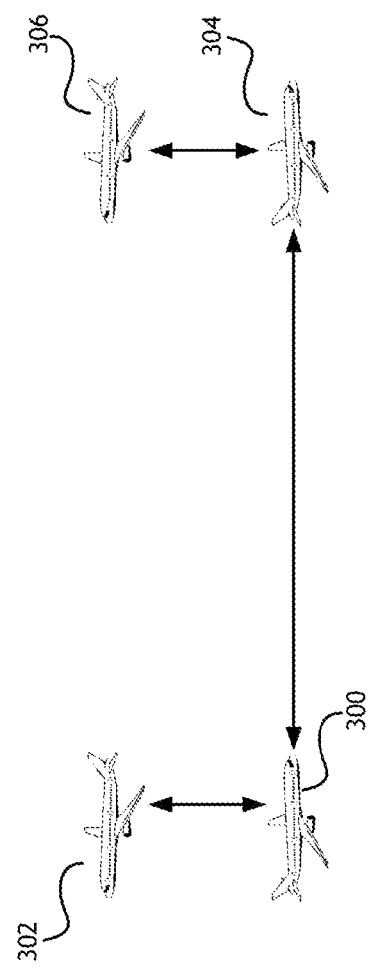
FIG. 3b shows a diagram of the node network of FIG. 3a with a new node added.
Figure 3C:
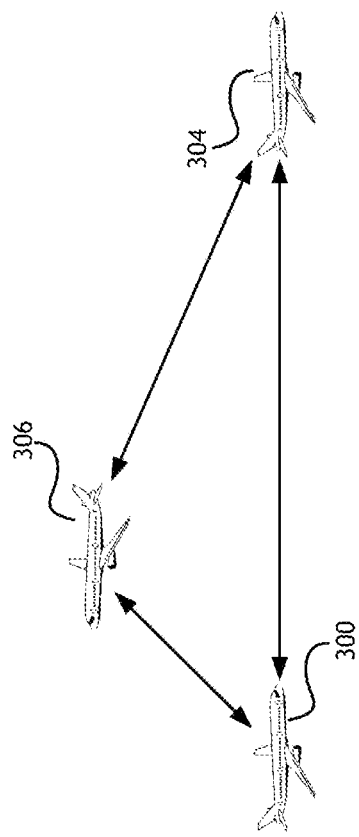
FIG. 3c shows a diagram of the node network of FIG. 3b with an old node removed.
Figure 3C:
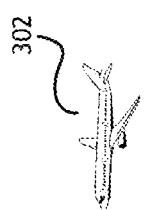

Referring to FIG. 3a, FIG. 3b and FIG. 3c, various sates in a self-organizing network are shown. The self-organizing network may include a plurality of aircraft 300, 302, 304 and 306; each aircraft may have one or more meteorological sensors, a transmitter, a receiver and a computer transmitting and receiving meteorological data from other aircraft 300, 302, 304 and 306 in the network. FIG. 3a shows aircraft 300, 302 and 304 in a self-organizing network with an aircraft 306 out of contact of any of the aircraft 300, 302 and 304 in the network. Each aircraft 300, 302 and 304 may independently establish a network connection with any other aircraft 300, 302 and 304 within contact. In this implementation, "within contact" generally refers to the existence of a reliable data link connection between two nodes, by any routing path or mechanism available. Each aircraft 300, 302 and 304 within the self-organizing network may send and receive meteorological data to and from any other aircraft 300, 302 and 304 in the self-organizing network.

In FIG. 3b, aircraft 302 has moved out or contact of aircraft 304 while aircraft 306 has moved within contact of aircraft 304. Because aircraft 302 and 304 are no longer in contact, the data link between aircraft 302 and 304 may be severed. Each aircraft 302 and 304 may perform any operations necessary to prevent erroneous routing of data; for example, removing the route from aircraft 302 to aircraft 304 from an internal routing table. Meanwhile aircraft 304 and 306 may each signal its availability to create a data link. Aircraft 304 and 306 may establish a data link and thereby add aircraft 306 to the self-organizing network. Aircraft 302 may no longer directly send or receive meteorological data to or from aircraft 304; however, aircraft 300 may relay meteorological data between aircraft 302 and aircraft 304. Furthermore, aircraft 306, while out of contact of aircraft 302, may send and receive meteorological data to and from aircraft 302 by relaying such data through aircraft 304 and aircraft 300. The aircraft 300, 302, 304 and 306 form a mesh network wherein each node in the network may communicate directly with other nodes in the network, and each node may relay communications between nodes. Each node may broadcast its availability to communicate with new nodes and listen for new nodes broadcasting their availability to communicate. Where two nodes are available to communicate with each other and have not established a data link, the nodes may establish a data link. Likewise, where two nodes have previously established a data link but are no longer available to communicate with each other, such as when the nodes are no longer within contact, each node may terminate such data link.

In FIG. 3c, aircraft 302 has moved out of contact of aircraft 300, 304 and 306 in the self-organizing network. Because aircraft 300 and 302 are no longer in contact, the data link between aircraft 300 and 302 may be severed. Each aircraft 300 and 302 may perform any operations necessary to prevent erroneous routing of data. Each aircraft 300, 304 and 306 may independently establish a network connection with any other aircraft 300, 304 and 306 within contact. Each aircraft 300, 304 and 306 within the self-organizing network may send and receive meteorological sensor data to and from any other aircraft 300, 203 and 304 in the self-organizing network. As aircraft 306 moves into contact of aircraft 300, each aircraft may signal its availability to create a data link. Aircraft 300 and 306 may establish a data link and thereby add an additional route for data in the self-organizing network.

In FIG. 3a, FIG. 3b and FIG. 3c, aircraft 300 and 304 may be flying through a region along the projected flight path of aircraft 302 and 306. Likewise, aircraft 302 and 306 may be flying through a region along the projected flight path of aircraft 300 and 304. Each aircraft 300, 302, 304 and 306 may have sensors for detecting meteorological data such as radar or accelerometers. Recent meteorological data concerning a region along the projected flight path of an aircraft may provide the pilot of the aircraft critical time to avoid weather related threats such as CAT. Furthermore, aircraft 302 and 306 may be flying at the same altitude and along the same flight path, but out of contact of each other. In that case, meteorological data may be relayed from a first aircraft 302 traveling along a given flight path to a second aircraft 306 traveling along the same flight path through intermediary aircraft 300 and 304 provided all aircraft 300, 302, 304 and 306 belong to a self-organizing network configured to relay meteorologically significant data to aircraft 300, 302, 304 and 306 within the self-organizing network.

Figure 4:
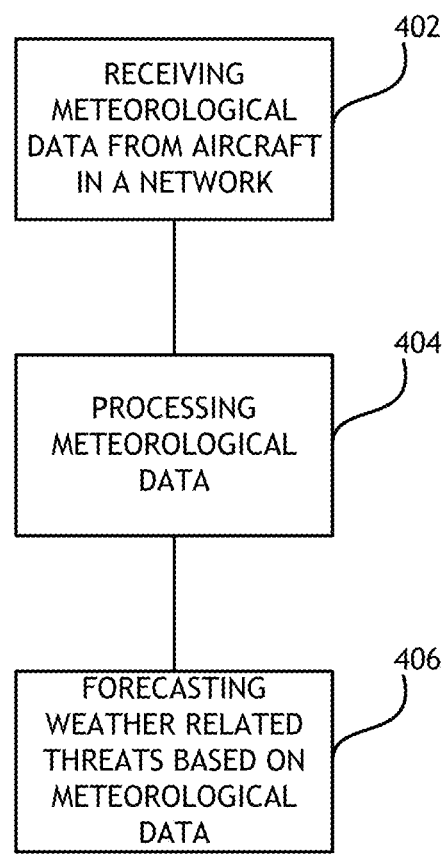
FIG. 4 shows a flowchart of one embodiment of the present invention.

Referring to FIG. 4, a method for forecasting weather related threats on board an aircraft is shown. The method may include receiving 402 meteorological data from aircraft in a self-organizing network. Each aircraft in a self-organizing network of aircraft may have a computer functionally connected to one or more meteorological data sensors. The computer may send data from the one or more meteorological data sensors to other aircraft in the self-organizing network and receive meteorological data from other aircraft in the self-organizing network. Each computer may actively broadcast a signal indicating its availability to function as a node in a self-organizing network, and each computer may actively listen for signals from other computers indicating that the other computers are available to act as nodes in a self-organizing network. Each computer may form data links with other computers such that each computer forms a node in a self-organizing network. Each computer may then send and receive meteorological data to and from each other computer as such data is generated by the one or more meteorological data sensors operably connected to each computer. Each computer may then process 404 the meteorological data to determine what data applies to the flight path of the aircraft. The computer may then forecast 406 weather related threats based on such meteorological data.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An apparatus, installed on an aircraft, comprising:
a processor;
memory connected to the processor storing computer readable code;
a receiver, operably connected to the processor, configured to receive meteorological data from one or more other aircraft;
a transmitter, operably connected to the processor, configured to transmit meteorological data to one or more other aircraft in a self-organizing mesh network; and
one or more meteorological data sensors operably connected to the processor, at least one of the one or more meteorological data sensors comprising an accelerometer configured to identify clear air turbulence in the aircraft;
wherein the computer readable code embodied in the memory configures the processor to:
transmit a signal indicating availability to join a self-organizing mesh network;
listen for signals from other sources indicating availability to join the self-organizing mesh network;
receive meteorological data from the one or more other aircraft in the self-organizing mesh network;
receive meteorological data from one or more sources outside the self-organizing mesh network via a satellite;
receive meteorological data from one or more sources outside the self-organizing mesh network via a ground station;
identify a location associated with each meteorological datum;
process the meteorological data to determine what meteorological data applies to a flight path of the aircraft based on the location of the meteorological datum, and to determine if the one or more other aircraft are flying at the same altitude as the aircraft; and
forecast one or more weather related threats along the flight path of the aircraft based on the meteorological data.

2. The apparatus of claim 1, wherein the computer readable code embodied in the memory is further configured to instruct the processor to correlate the meteorological data with data from the one or more meteorological data sensors.

3. The apparatus of claim 2, wherein the computer readable code embodied in the memory is further configured to instruct the processor to transmit the data from the one or more meteorological data sensors to the one or more other aircraft.

4. The apparatus of claim 3, wherein the computer readable code embodied in the memory is further configured to instruct the processor to re-transmit the meteorological data.

5. The apparatus of claim 1, wherein the computer readable code embodied in the memory is further configured to instruct the processor to re-transmit the meteorological data.

6. The apparatus of claim 1, wherein the one or more meteorological data sensors comprises a radar.

7. An aircraft comprising:
a processor;
memory connected to the processor storing computer readable code;
a receiver, operably connected to the processor, configured to receive meteorological data from one or more other aircraft;
a transmitter, operably connected to the processor, configured to transmit meteorological data to one or more other aircraft; and
one or more meteorological data sensors operably connected to the processor, at least one of the one or more meteorological data sensors comprising an accelerometer configured to identify clear air turbulence in the aircraft;
wherein the computer readable code embodied in the memory configures the processor to:
transmit a signal indicating availability to join a self-organizing mesh network;
listen for signals from other sources indicating availability to join the self-organizing mesh network;
receive meteorological data from one or more sources outside the self-organizing mesh network via a satellite;
receive meteorological data from one or more sources outside the self-organizing mesh network via a ground station;
receive meteorological data from the one or more other aircraft in the self-organizing mesh network;
identify a location associated with each meteorological datum;
process the meteorological data to determine what meteorological data applies to a flight path of the aircraft based on the location of the meteorological datum, and to determine if the one or more other aircraft are flying at the same altitude as the aircraft; and
forecast one or more weather related threats along the flight path of the aircraft based on the meteorological data.

8. The aircraft of claim 7, wherein the computer readable code embodied in the memory is further configured to instruct the processor to correlate the meteorological data with data from the one or more meteorological data sensors.

9. The aircraft of claim 8, wherein the computer readable code embodied in the memory is further configured to instruct the processor to transmit the data from the one or more meteorological data sensors to the one or more other aircraft.

10. The aircraft of claim 9, wherein the computer readable code embodied in the memory is further configured to instruct the processor to re-transmit the meteorological data.

11. The aircraft of claim 7, wherein the computer readable code embodied in the memory is further configured to instruct the processor to re-transmit the meteorological data.

12. The aircraft of claim 7, wherein the one or more meteorological data sensors comprises a radar.

13. A method for locating weather related threats in an aircraft comprising:
transmitting a signal indicating availability to join a self-organizing mesh network;
listening for signals from other sources indicating availability to join the self-organizing mesh network;
receiving, with a computer processor, meteorological data from one or more aircraft via a mesh network for sharing air data between aircraft for threat detection comprising a plurality of self-organizing nodes, the one or more aircraft identified as having meteorological data relevant to desired flight path, the meteorological data comprising data corresponding to one or more accelerometers configured to identify clear air turbulence;

receiving meteorological data from one or more sources outside the self-organizing mesh network via a satellite;

receiving meteorological data from one or more sources outside the self-organizing mesh network via a ground station;

identifying, with a computer processor, a location associated with each meteorological datum;

processing the meteorological data to determine what meteorological data applies to a flight path of the aircraft based on the location of the meteorological datum, and to determine if the one or more other aircraft are flying at the same altitude as the aircraft; and forecasting, with a computer processor, one or more weather related threats along the flight path of the aircraft based on the meteorological data.

14. The method of claim 13, further comprising correlating, with a computer processor, the meteorological data with data from one or more meteorological data sensors on board the aircraft.

15. The method of claim 14, further comprising transmitting, with a computer processor, the data from the one or more meteorological data sensors to the one or more aircraft.

16. The method of claim 15, further comprising re-transmitting, with a computer processor, the meteorological data to one or more aircraft via the mesh network.

\* \* \* \* \*